(No Model.)

R. E. HENNINGES.
SASH FASTENER.

No. 320,353. Patented June 16, 1885.

WITNESSES:
Thos. Houghton.
Amos W. Hart

INVENTOR:
R. E. Henninges
BY Munn & Co.
ATTORNEYS.

UNITED STATES PATENT OFFICE.

REINHOLD E. HENNINGES, OF CLEVELAND, OHIO.

SASH-FASTENER.

SPECIFICATION forming part of Letters Patent No. 320,353, dated June 16, 1885.

Application filed January 31, 1885. (No model.)

*To all whom it may concern:*

Be it known that I, REINHOLD E. HENNINGES, a citizen of the United States, residing at Cleveland, in the county of Cuyahoga and State of Ohio, have invented certain new and useful Improvements in Sash-Fasteners, of which the following is a description.

My invention is an improvement in the class of sash-fasteners consisting, mainly, of a rack and pinion. Heretofore the pinion has been arranged in a recess in the casing and the rack applied to the contiguous portion of one of the sliding window-sashes. By this arrangement only such one of the sashes could be raised or lowered or locked by means of the pinion. In my improvement I construct the box containing the pinion so that it is adapted for attachment to the top rail of the lower sash. Both sashes may therefore be raised or lowered simultaneously or locked in any adjustment, or one may be raised or lowered alone. Besides these differences and advantages, I have also adapted an improved construction and arrangement of devices for locking and releasing the pinion, as hereinafter described.

Figure 1:
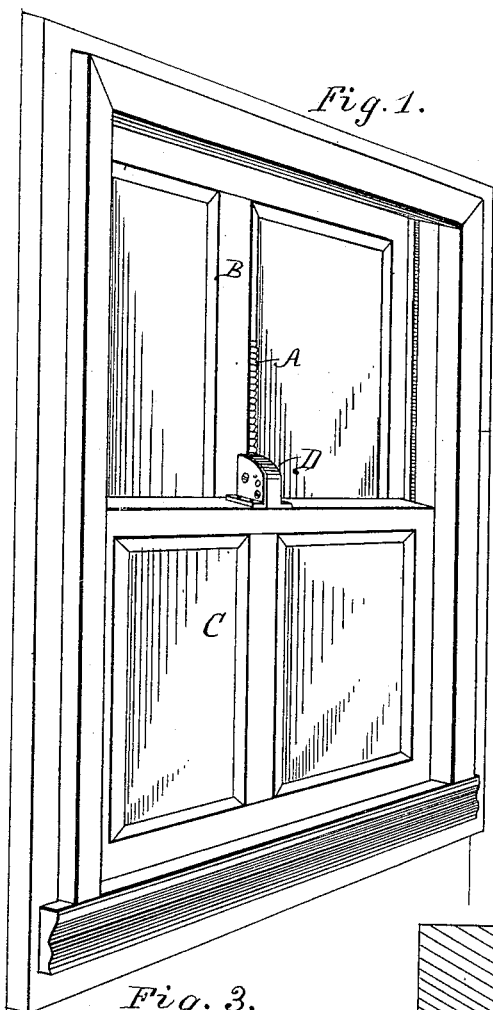
Figure 2:
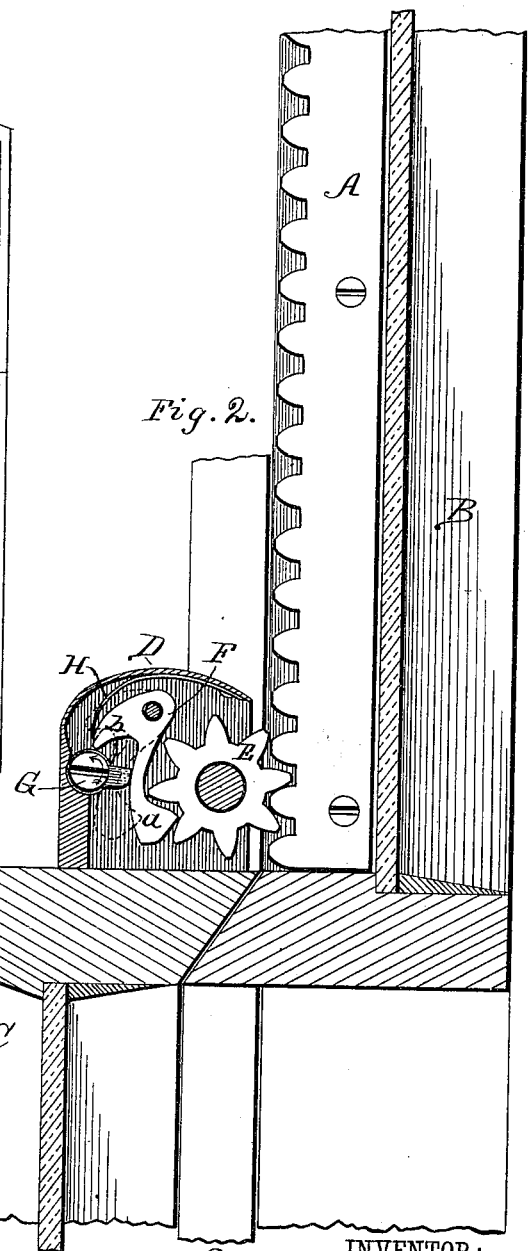
Figure 3:
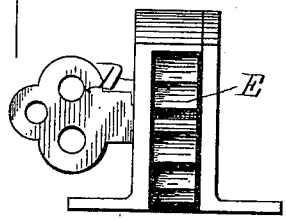

In the accompanying drawings, Figure 1 is a perspective view of a window having my improvement applied. Fig. 2 is a vertical section of the same. Fig. 3 is a face view of the inner side of my improved device.

The letter A indicates a rack-bar, which is, in practice, secured by screws, as shown, to the inner side of one of the vertical bars of the upper sash, B. On the upper bar or meeting-rail of the lower sash, C, is similarly secured a metal box, D, having lateral flanges provided with holes to receive fastening-screws. Said box contains a pinion, E, also a dog, F, for locking the pinion, and a pivoted device, G, combining the function of tumbler and detent, since it both operates and locks the dog. These parts—to wit, pinion, dog, and combined tumbler and detent—are provided with shafts or journals having their bearings in the parallel and wider sides of box D. The open side of the latter is toward the rack-bar A, so that the pinion E may mesh with it, as shown in Fig. 2. The dog F is pendent from the central top portion of the box D, and provided at its free end with a nose, $a$, adapted to engage with the teeth of pinion E, and at its upper or pivotal end with a lateral arm, $b$, with which the combined detent and tumbler G coacts, as hereinafter described. The device G is pivoted near the front side of the box D in about the same horizontal plane as the pinion E, and may be turned up or down, to operate or lock the dog F, by means of a key, Fig. 3, inserted in a suitable recess in one end of its journal or shaft. A spring, H, is arranged to act on the arm $b$ of the dog F, for the purpose of holding it normally engaged with the pinion E.

The operation of the invention is as follows: When the parts are in the position shown in Fig. 2, the dog F engages the pinion E, and is held in such position by the device G, which then performs the office of a detent, since it rests in contact with the dog, and prevents the same from moving backward. The pinion E being thus held locked in mesh with the rack-bar A, it is obvious the sashes B C are thereby fastened together so that neither can move independently; and it is further apparent that this relation of parts may exist when the sashes are open to any extent permitted by the length of the rack-bar. To change the relative position of the sashes—say to open them—the key is inserted in the shaft of detent G and turned in the direction indicated by the arrow, Fig. 2, thereby swinging said detent upward, out of contact with the dog, and causing it to perform the function of a tumbler by acting on the arm, $b$, of dog F, and through the leverage thus exerted throwing the free end $a$ out of engagement with the pinion E, as shown by dotted lines, Fig. 2, so that the latter, E, may rotate freely, and thereby permit vertical movement of either or both sashes for opening one or both of them. When the detent G is in the position shown in dotted lines, it holds the dog F out of engagement with the pinion. It holds it engaged therewith when in the alternate position.

The invention thus enables a window to be left open, and yet securely locked, at any safe distance, and yet secures it from danger of being forced farther open.

I do not claim, broadly, the combination of a pinion, rack-bar, and dog for locking the former; but,

Having thus described my invention, what I claim as new is—

1. The combination, with sliding window-sashes, of the rack A, attached to the upper sash, the box D, having lateral apertured flanges, and secured to the upper bar of the lower sash, and the pinion, dog, and detent inclosed by said box, all as shown and described, to operate as specified.

2. The combination, with the box D and pinion E, of the dog F, pivoted at its upper end, and having nose $a$ and rearwardly-curved arm $b$, and the rotatable detent G, arranged beneath said arm, all as shown and described, to operate as specified.

REINHOLD E. HENNINGES.

Witnesses:
 THOMAS DAVIS,
 OTTO J. FREY.